March 19, 1963  H. A. BLENKLE  3,081,647
REGENERATIVE STEERING
Filed Feb. 27, 1957  3 Sheets-Sheet 2

INVENTOR.
Herbert A. Blenkle
BY
ATTORNEYS

March 19, 1963 H. A. BLENKLE 3,081,647
REGENERATIVE STEERING
Filed Feb. 27, 1957 3 Sheets-Sheet 3
FIG. 4
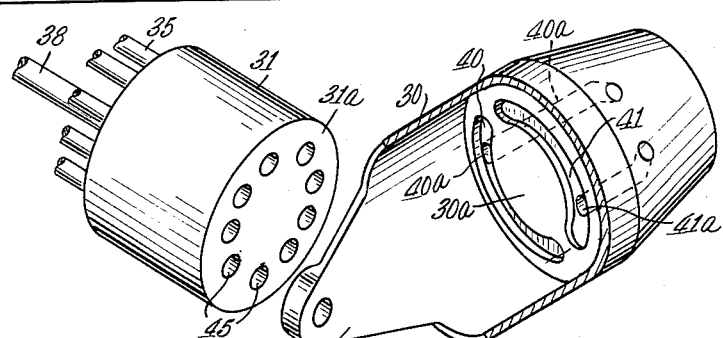
FIG. 8A 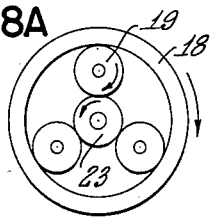 FIG. 8B 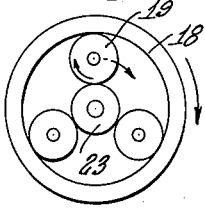 FIG. 8C 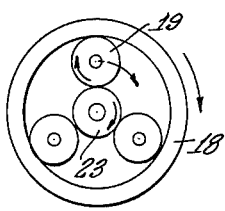
FIG. 5 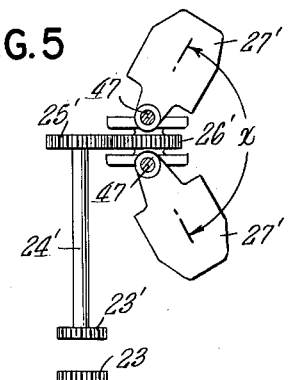 FIG. 6 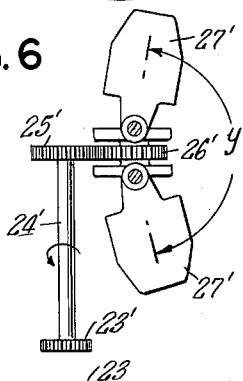 FIG. 7 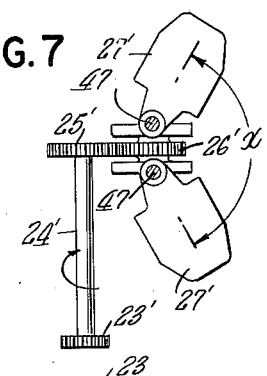
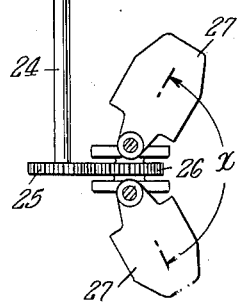 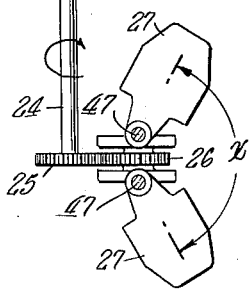 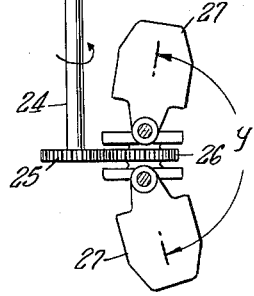
*INVENTOR.*
Herbert A. Blenkle
BY
*Brumbaugh, Free, Graves & Donohue*
ATTORNEYS

United States Patent Office 3,081,647
Patented Mar. 19, 1963

3,081,647
REGENERATIVE STEERING
Herbert A. Blenkle, Leonia, N.J., assignor to Fairchild Stratos Corporation, a corporation of Maryland
Filed Feb. 27, 1957, Ser. No. 642,632
3 Claims. (Cl. 74—710.5)

This invention relates to a power transmitting drive system for traction vehicles in which power from a single drive is transmitted to multiple outputs, and including control means for varying the relative velocities and torques transmitted to the outputs so as to provide for directional control of the vehicle with a minimum of loss in power. The present invention is particularly applicable to traction vehicles of the caterpillar type.

The difficulties of obtaining adequate directional control for traction vehicles of the caterpillar type are well known. The usual practice has been to employ braking and clutching mechanisms to control the relative velocities and torques transmitted to the endless belts or treads on different sides of the vehicle, and to utilize these to slow one tread while permitting the other to operate at a higher relative speed. The vehicle is thereby caused to turn with the one tread following an arcuate path and the other tread serving as a pivot for the vehicle.

In the operation of such vehicles, there is a pronounced tendency for the vehicle to drift due primarily to the varying resistances encountered by the treads during their travel across the terrain. For example, such drifting may be caused by obstructions encountered by the treads, by changes of grade, or by conditions of the terrain, such as snow, ice, mud, etc. This tendency of the vehicle to drift requires that constant steering corrections be made in order to enable the vehicle to follow a predetermined path of travel. It is obvious, therefore, that a considerable quantity of otherwise useful power will be dissipated by the frequent application of brakes and by the operation of clutches merely to maintain directional control of the vehicle. Also, in the design of such vehicles, this enormous amount of power dissipated must be taken into consideration by providing oversize drive means, thereby adding to the over-all weight and size of the vehicle, as well as to the cost thereof.

Proposals have been heretofore made for drive transmission systems for such vehicles which would enable directional control to be exercised without the constant application of brakes and clutches. Unfortunately, these mechanisms have been for the most part either extremely complex, complicating production and maintenance and presenting logistics problems in the case of military vehicles, or cumbersome, resulting in loss of valuable space and imposing a severe weight penalty on the vehicle. As a consequence, therefore, these mechanisms have proved generally less satisfactory than the drive systems which they were intended to improve.

In the present invention, the aforementioned difficulties have been overcome by providing a drive transmitting system in which the driving power is transmitted to the treads or tracks on opposite sides of the vehicle from a single drive via dual planetary gear systems and in which the output of each planetary system is controlled by an adjustable hydraulic lock. The hydraulic lock is provided by a variable displacement hydraulic pump or motor which is operatively connected to each of the planetary gear systems. In addition, the hydraulic pumps or motors associated with the left and right drives are linked together by a hydraulic coupling or circuit through which, at times, regenerative power can be transmitted from one output of the power drive transmitting system to the other so that power not utilized in one tread or track during turning or steering is made available to the other tread.

For a complete understanding of the present invention, reference may be made to the detailed description which follows and to the accompanying drawings in which:

FIGURE 1 is a plan view, partly in cross-section, illustrating the drive transmission system of the present invention;

FIGURES 2 and 3 are elevational views taken substantially along the section lines 2—2 and 3—3, respectively, of FIGURE 1 looking in the direction of the arrows;

FIGURE 4 is an isometric exploded view illustrating one of the hydraulic units used in the system with one of the parts thereof turned relative to the other;

FIGURES 5, 6 and 7 are plan views of some of the parts shown in FIGURE 1 with certain of these parts in different adjusted positions to illustrate the operation of the directional steering control; and FIGURES 8A, 8B and 8C are schematic elevational views of one of the planetary gear systems, illustrating the direction of rotation of the gears under different conditions of operation.

Figure 1:
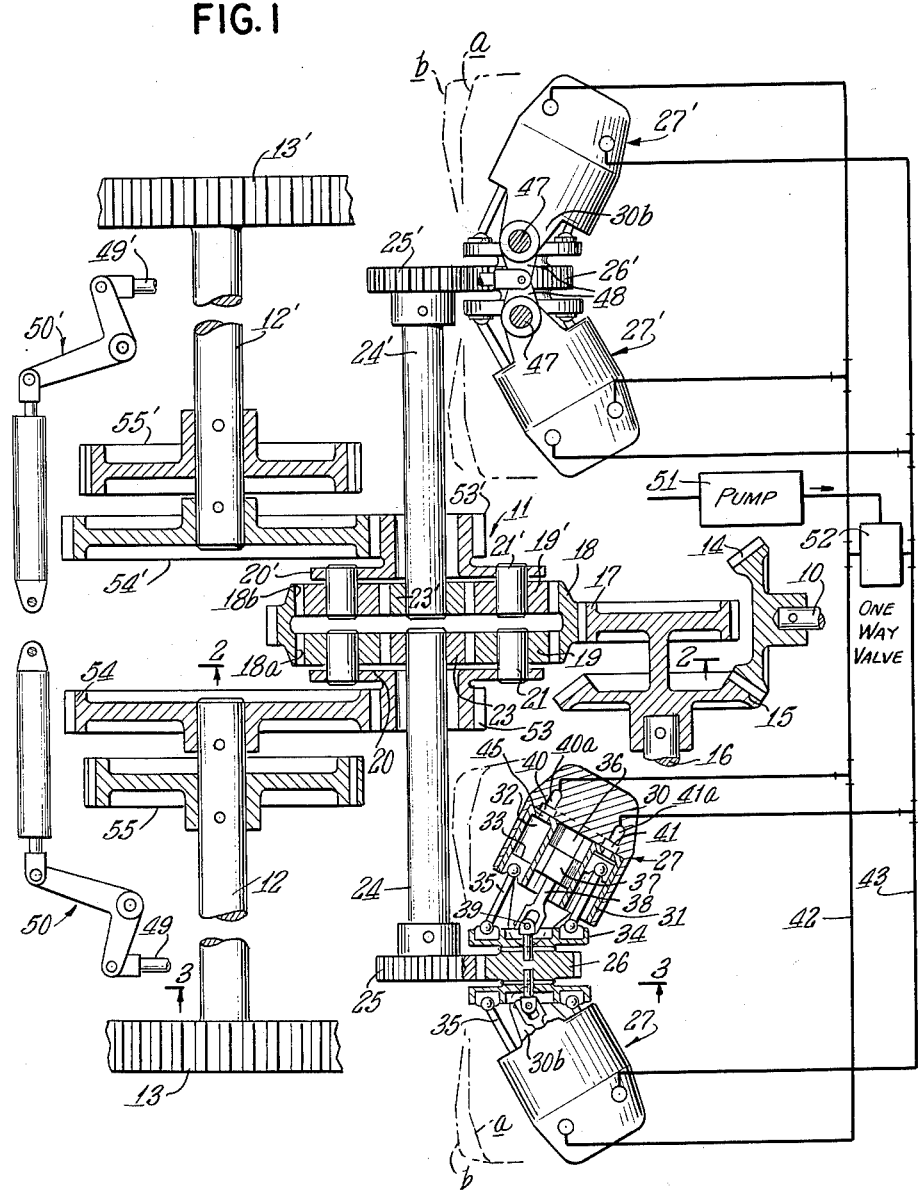
Figure 2:
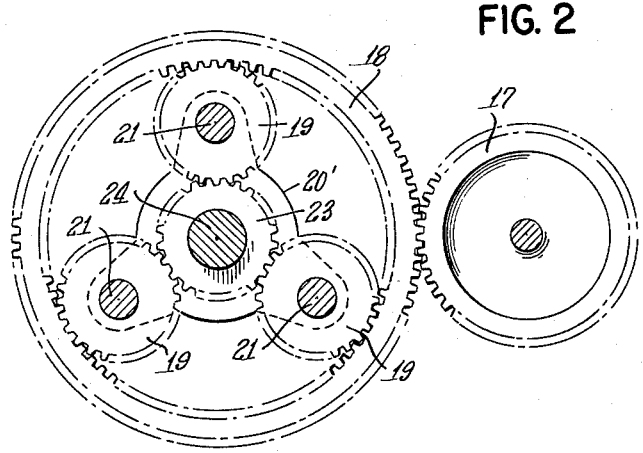
Figure 3:
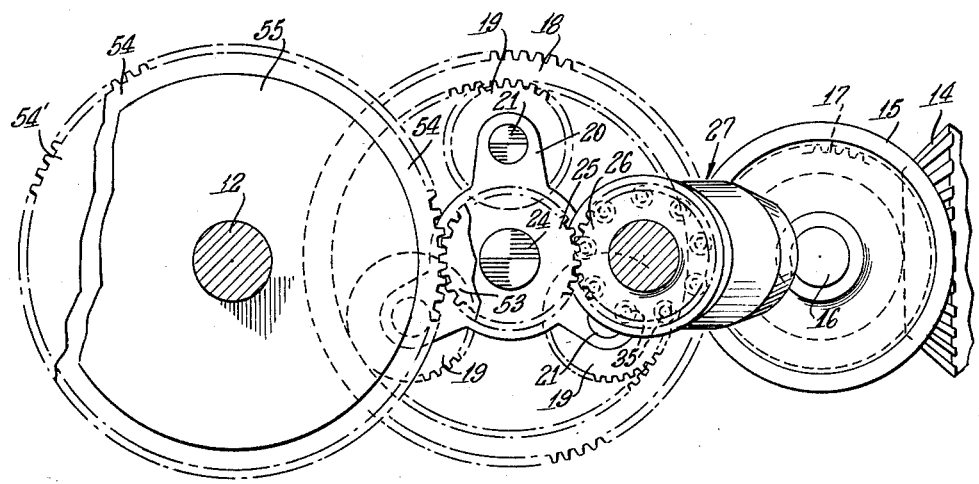

Referring to the drawings, and particularly FIGURE 1, the drive transmission system of the present invention comprises generally a shaft 10 driven by a main engine (not shown), a dual planetary gear system generally designated 11, and a pair of output shafts 12 and 12' having sprockets 13 and 13' mounted at the extreme ends thereof which transmit the drive to the endless moving belts, treads or tracks on opposite sides of the traction vehicle. The shaft 10 carries a bevel gear 14 at the extreme end thereof which meshes with a bevel gear 15 carried at the extreme end of a rotatable shaft 16. A pinion 17 is formed integrally with and spaced from one face of the bevel gear 15, so that the pinion 17 and the bevel gear 15 rotate as a unit. The pinion 17, in turn, drives the outer ring gear 18 of the planetary gear system at constant speed.

The outer ring gear 18 is provided with two sets of internal gear teeth 18a and 18b (see FIGURE 1). The teeth 18a mesh with three planetary gears 19 rotatably supported in the arms of a spider 20, and, similarly, the internal teeth 18b mesh with three planetary gears 19' rotatably supported in a rotary spider 20'. The individual planetary gears 19 and 19' are mounted on stub shafts 21 and 21', respectively, carried by the arms of the spiders 20 and 20', respectively.

The planetary gears 19 also mesh with a centrally located sun gear 23 which is mounted at the extreme end of a rotatable torque reaction shaft 24, the sun gear 23 being coaxial with the outer ring gear 18. In like manner, the planetary gears 19' mesh with a sun gear 23' which is mounted at the extreme end of a rotatable torque reaction shaft 24'. The reaction shafts 24 and 24' are disposed end to end and are supported in suitable bearings (not shown) for rotation on a common axis.

The shafts 24 and 24' are each equipped at their outermost extremities with gears 25 and 25', respectively, which mesh with control gears 26 and 26', respectively. The rotation of the gears 26 and 26' is influenced by hydraulic positive displacement units 27 and 27', respectively, which will be more fully described below, so that for present purposes it may be merely mentioned that these units operate at times (a) to resist the tendency of either or both of the reaction shafts 24 and 24' to rotate, (b) to lock either or both of the reaction shafts against rotation in either direction, or (c) to drive either or both of the reaction shafts. More specifically, the positive displacement units 27 are coupled hydraulically with the units 27' so that at times the hydraulic coupling serves as a lock therebetween, whereas at other times it transmits power from the units operating as pumps to the units operating as motors.

The positive displacement hydraulic units 27 and 27' are all identical, so that it is necessary to describe but one in detail. A typical positive displacement unit is shown in FIGURE 4 of the drawings. Referring to that figure, it will be noted that it comprises a non-rotating housing 30 and a block 31 rotatably mounted therein. As shown in FIGURE 1, the rotatable block 31 contains a plurality of cylinder bores 32 arranged axially therein in circular array, and each bore accommodates a movable piston 33 therein. The pistons 33 are each connected with a socket disk 34 fixedly mounted to one side face of the gear 26 by a plurality of substantially parallel piston rods 35. The socket disk 34 incorporates a number of ball-type sockets which receive the ball-type ends of the piston rods 35. The piston rods 35 are connected in similar fashion to the movable pistons. In addition, an axial bore 36 of polygonal or non-circular cross-section is formed in the end of the rotatable cylinder block 31 nearest the socket disk 34. This bore accommodates an axially slidable member 37 of complementary cross-section. This member 37 is connected by a shaft 38 and a universal coupling 39 to the socket disk 34 so that the rotatable cylinder block 31 is coupled to and rotates with both the socket disk 34 and the gear 26.

The connecting rods 35 are all equal in length, and each piston is situated within its respective cylinder bore so that the angular position of the positive displacement unit relative to the axis of the gear 26 will determine whether the pistons will reciprocate within their respective cylinder bores during the rotation of the cylinder block 31, provided, of course, that the cylinder block is permitted to rotate.

As best shown in FIGURE 4, the end 31a of the rotary cylinder block 31 remote from the gear 26 abuts against the inner surface or plate 30a of the housing 30. This plate 30a is provided with two substantially semi-circular slots 40 and 41 therein. The slot 40 communicates via a passage 40a in the housing 30 with a fluid conduit 42 (see FIGURE 1). Similarly, the slot 41 communicates via a passage 41a with a fluid conduit 43. The semi-circular slots 40 and 41, in turn, each communicate with substantially half of the cylinder bores 32 in the cylinder block 31 through ports 45 formed in the end 31a of the cylinder block.

Although there are two positive displacement hydraulic units associated with each of the gears 26 and 26', it should be understood that they are symmetrically arranged and move in synchronism so that they influence the respective gear 26 or 26' in precisely the same manner. Accordingly, one of the two hydraulic units 27 and one of the units 27' could be dispensed with if desired.

The housing 30 of each of the hydraulic units is provided with upper and lower ears 30b, each of which is affixed on separate pivot shafts 47. The pivot shafts 47, in turn, may depend from suitable frame structures of the vehicle. The pivot shafts 47 each carry arms 48 affixed thereto which are pivotally connected to links 49 or 49', the link 49 being associated with the units 27 on one side of the vehicle and the link 49' being associated with the units 27' on the opposite side of the vehicle.

Thus, the operation of the link 49 is capable of pivotally adjusting the units 27 about their respective pivot shafts 47, as indicated by the positions represented in solid and phantom lines in FIGURE 1; similarly, the link 49' is capable of pivotally adjusting the units 27' in like manner. The links 49 and 49' are, in turn, actuated by suitable manual controls (not shown) through hydraulic booster systems and mechanical linkages, only portions of which are shown, designated 50 and 50', in such fashion that movement may be imparted to the operating links 49 and 49' independently.

The hydraulic units 27 and 27' are all coupled in parallel by a hydraulic circuit comprising the fluid conduits 42 and 43 (see FIGURE 1). These fluid conduits 42 and 43 are maintained charged with fluid at all times by means of a make-up pump 51 which supplies fluid under pressure from a storage reservoir (not shown) via a one-way valve 52. In this way, any leakage which occurs in either of the fluid conduits 42 or 43 is immediately replenished. Replenishment of the fluid in the conduits 42, 43 may also be provided for in various other ways, such as by utilizing an expansion tank for the replenishment of the fluid in combination with a pressure accumulator for maintaining the system under pressure.

Power is transmitted via the dual planetary gear system 11 to the output shaft 12 by means of a gear 53 formed on a hub portion of the spider 20. The gear 53 meshes with a gear 54 carried by the output shaft 12. In similar fashion, power is transmitted via the dual planetary gear system 11 to the output shaft 12' by means of a gear 53' formed on the hub portion of the spider 20' which meshes with the gear 54' affixed to the shaft 12'. The hub portions of the spiders 20 and 20' surround the torque reaction shafts 24 and 24', respectively, with ample clearance, since, of course, they rotate independently of each other.

The output shafts 12 and 12' are mounted for rotation in suitable bearings on opposite sides of the vehicle. The shafts 12 and 12' carry conventional brake drums 55 and 55', respectively, which are provided primarily for the purpose of bringing the vehicle to a stop. The brakes, therefore, would not normally be utilized in the steering of the vehicle.

From the foregoing description it is evident that the power transmitted from the common drive shaft 10 to each of the output shafts 12 and 12' by the planetary gear systems will be influenced and controlled by the adjusted positions of the variable displacement units 27 and 27'. The hydraulic units associated with one planetary gear system are pivotally adjustable independently of the units associated with the other planetary gear system, but inasmuch as both sets of units are linked together by a hydraulic coupling or circuit, namely, the fluid conduits 42 and 43, the adjustment of one set of units to change their effect on the corresponding torque reaction shaft also influences, although not in the same manner, the effect of the other set of units on the other torque reaction shaft. As terms of reference for purposes of this description, the position of the units 27 and 27' shown in solid lines in FIGURE 1 will be referred to as the "full" angle position; the position of the units represented in phantom lines and identified by the reference symbol a in FIGURE 1, that is to say, the position in which the axes of units and corresponding gear 26 or 26' are coincident, will be referred to as the "zero" angle position; any position therebetween will be referred to as a "partial" angle position; and any position beyond a "zero" angle position, such as the position represented in phantom lines and identified by the reference symbol b in FIGURE 1, will be referred to as a "negative" angle position.

To illustrate the influence of the hydraulic displacement units and the hydraulic coupling therebetween on the output of each of the planetary gear systems, let us assume that the hydraulic units 27 have all been adjusted to their "zero" angle position, that is to say, the position designated a in FIGURE 1 of the drawings. The hydraulic units, in this position, will have virtually no influence on the torque reaction shafts 24 for the reason that no reciprocation is imparted to the pistons 33 by the rotation of the cylinder block 31 due to the angular disposition of the units. The direction of rotation of the gears of the planetary gear system under this condition is illustrated in FIGURE 8A of the drawings. The outer ring gear 18 is, of course, driven at constant speed from the shaft 10. This direction of rotation is indicated, for purposes of illustration, to be in the clockwise direction. The spider 20 which carries the supporting shaft 21 of each of the planetary gears 19, being coupled directly to the output shaft 12 of the vehicle, offers considerable resistance to the bodily translation of the axis of the planetary gear in an orbital path, so that the axis of the planetary gear 19 remains stationary, transmitting rotation from the ring gear 18 to the sun gear 23 of the torque reaction shaft 24. Thus, there is no torque transmitted to output shaft 12. This would be true regardless of the position of adjustment of the units 27'.

Consider, now, that all of the hydraulic units 27 and 27' are adjusted to the full angle position, that is, the position shown in solid lines in FIGURE 1. It is evident that rotation of the cylinder block 30 is possible only if the pistons 33 are permitted to reciprocate within their respective cylinder bores. However, the pistons oppose each other so that a balanced lock exists therebetween preventing the rotary cylinder blocks 30 of either the units 27 or 27' from rotating. This also locks the torque reaction shafts 24 and 24' against rotation. This condition is shown schematically in FIGURE 8B. The outer ring gear 18 driven at constant speed will cause the planetary gear 19 to travel around the outer periphery of the locked sun gear 23, imparting rotation to the spider 20 which, in turn, is transmitted to the output shaft 12 to drive the respective tread or track of the vehicle. The drive is transmitted to the output shaft 12' in the same manner, with the result that the power from the drive shaft 10 is divided equally between both output shafts 12 and 12'. This, therefore, represents the adjusted positions of the units 27 and 27' when it is desired to move the traction vehicle in a straight path.

As the hydraulic units are adjusted from the "full" angle position toward the "zero" angle position, the braking or locking action which they exert on the corresponding torque reaction shaft is progressively reduced, so that the torque and velocity transmitted to the respective output shaft is also reduced. However, if only the hydraulic displacement units associated with one of the planetary gear systems are adjusted to a "partial" angle and the units associated with the other planetary gear system are held at the "full" angle position, any rotation of the unlocked torque reaction shaft is transmitted as regenerative power to the other torque reaction shaft. Thus, the hydraulic displacement units at "partial" angle function as pumps driving the hydraulic displacement units at "full" angle. When, however, the one set of hydraulic displacement units is adjusted to the "zero" angle position and the other sets of units is held at the "full" angle position, the torque reaction shaft associated with the units at "zero" angle is unlocked and the torque reaction shaft associated with the units at "full" angle position is locked, so that the power is transmitted only to the output shaft associated with the units at "full" angle position.

With these principles in mind, the steering operation of the traction vehicle can best be explained with reference to FIGURES 5, 6 and 7 of the drawings. In FIGURE 5, the units 27 and 27' are illustrated in their "full" angle positions so that both torque reaction shafts 24 and 24' are locked. The angle $x$ represents the included angle between both the axes of the units 27 and the axes of the units 27', this angle being the minimum angle which the adjustments of the units make possible. As explained above, with the reaction shafts 24 and 24' thus locked against rotation, the dual planetary gear system transmits equal torque and equal velocity to the output shafts 12 and 12' moving the vehicle in a straight path.

If now the pumps 27' are adjusted to a "partial" angle position, such that the included angle $y$ between their axes exceeds the angle $x$ between the axes of the pumps 27, the braking action on the reaction shaft 24' is thereby reduced, so that reduced torque and velocity are transmitted to the output shaft 12'. In addition, regenerative power is transmitted from the positive displacement units 27' operating as pumps via the fluid conduits 42 and 43, to the positive displacement units 27 operating as driven motors, and this regenerative power will tend to drive the torque reaction shaft 24 in a direction opposite to that which it would normally turn if it were unlocked. The rotation of the planetary gear system in transmitting power to the output shaft 12 is represented schematically in FIGURE 8C of the drawings, in which it is evident that by virtue of the rotation of both the outer ring gear 18 and the sun gear 23 in the same direction, bodily translation at an increased rate of speed is imparted to the axis of the planetary gear 19 and to the spider 20 which, in turn, is transmitted to the output shaft 12. The output shaft 12 being driven at a higher velocity than the output shaft 12', the vehicle will tend to turn about the track or tread driven by the shaft 12' to provide steering control.

Steering in the opposite direction is accomplished by the adjustment of the hydraulic units 27 and 27' to the positions illustrated in FIGURE 7 of the drawings, which positions are the reverse of the positions illustrated in FIGURE 6.

Under some conditions, traction vehicles may encounter unusual resistance to turning. To overcome this resistance, it may be necessary not only to reduce the power transmitted to the inboard track to zero, but actually to brake or physically absorb power which is imparted thereto by the momentum of the vehicle. By way of illustration, let us consider that the vehicle is following a straight path and that a turn to the left is desired. The left hydraulic units are adjusted first to a reduced angle and then to a "zero" angle, but the vehicle is still unable to make the turn because of excessive resistance. Under these conditions, it may be found desirable to adjust the left hydraulic units beyond the "zero" angle to a "negative" angle. The hydraulic pressure then forces the left hydraulic units to turn in such a direction as to force the left track to run slower than the right track. This forced reduction in speed is equivalent to a braking action on the corresponding output shaft. However, the braking power is not dissipated in the form of heat, but is instead transmitted to the opposite output shaft and track.

The invention has been shown in a single preferred form and by way of example only, and obviously many modifications and variations may be made therein without departing from the spirit of the invention. It is understood, therefore, that the invention is not to be limited to any specified form or embodiment, except in so far as such limitations are set forth in the claims.

I claim:
1. A drive transmission to afford steering control for a traction vehicle having right and left endless tracks comprising drive means, a separate driven shaft for driving each endless track, separate planetary gear transmission systems connecting the drive means with each of the driven shafts, a pair of reversible torque reaction shafts, each mechanically coupled to but one of the planetary gear transmission systems to influence the drive transmitted to the corresponding driven shaft, whereby one torque reaction shaft operates independently of the other, an angularly adjustable, variable stroke, multi-piston hydraulic unit operatively connected in drive-transmitting relationship with each of said torque reaction shafts, the angularly adjusted position of the hydraulic unit regulating the stroke of the pistons thereof, a hydraulic coupling connecting the hydraulic unit associated with one of the torque reaction shafts with the hydraulic unit associated with the other of the torque reaction shafts, the hydraulic units permitting free rotation of their respective torque reaction shafts in one adjusted position thereof, locking the torque reaction shafts when both hydraulic units are in another adjusted position, and driving their respective torque reaction shafts in one direction or the other when they are in different angularly adjusted positions, and means to adjust the hydraulic units to the same or different angular positions.

2. A power transmitting system to afford steering control to a traction vehicle of the caterpillar type equipped with tracks on each side of the vehicle to impart movement thereto comprising a drive shaft, a pair of driven shafts for driving the tracks on opposite sides of the vehicle, a separate planetary gear system for transmitting power from said drive shaft to each of said driven shafts, each such planetary gear system including an outer ring having both internal and external teeth, an inner sun gear coaxial with the outer ring gear, a planetary gear meshing with the teeth of said sun gear and the internal teeth of said outer ring gear, and a spider rotatable coaxially with the ring and sun gears, said planetary gear being rotatably mounted on said rotatable spider eccentrically of the axis of rotation of the spider, said power transmission system further comprising means for transmitting power from the rotatable spider associated with each of said planetary gear systems to the corresponding driven shaft, a gear meshing with the external teeth of said ring gear and being driven at constant speed by said drive shaft, torque reaction shafts connected to the sun gears of each of said planetary gear systems, each torque reaction shaft being mechanically coupled to a component of but one said planetary gear systems, a variable stroke, multi-piston hydraulic pump operatively coupled to each of said torque reaction shafts, means for pivotally adjusting said hydraulic pumps to the same or different angular positions, the adjusted position of each of said variable displacement hydraulic pumps determining the torque and the direction thereof applied thereby to the corresponding torque reaction shaft, and the torque and the direction thereof applied to the torque reaction shaft, in turn, determining the power transmitted by said planetary gear system to the corresponding driven shaft, means for pivotally adjusting said hydraulic pumps to the same or different angularly adjusted positions, and fluid conduits between the hydraulic pump associated with one torque reaction shaft and the hydraulic pump associated with the other torque reaction shaft whereby in certain relative adjusted positions of the hydraulic pumps the torque reaction shafts are locked against rotation and in other relative adjusted positions thereof regenerative power is transmitted through the fluid conduits from one torque reaction shaft to the other.

3. A power transmission system as set forth in claim 2 wherein each of the hydraulic pumps comprises a pivotally mounted housing, a cylinder block rotatably mounted in said housing, a plurality of cylinder bores formed in circular array within said rotatable cylinder block, passage means in said housing communicating with said fluid conduits, ports in said rotatable cylinder block establishing periodic communication between said cylinder bores and said passage means, pistons movable in the cylinder bores, and piston rods operatively coupling the pistons and the respective torque reaction shaft.

References Cited in the file of this patent
UNITED STATES PATENTS

| | | |
|---|---|---|
| 2,256,324 | Orshansky | Sept. 16, 1941 |
| 2,336,911 | Zimmermann | Dec. 14, 1943 |
| 2,336,912 | Zimmermann | Dec. 14, 1943 |
| 2,377,354 | Merritt | June 5, 1945 |
| 2,487,617 | Tweedale | Nov. 8, 1949 |
| 2,560,554 | Colby | July 17, 1951 |
| 2,580,946 | Orshansky | Jan. 1, 1952 |